Figure 1:
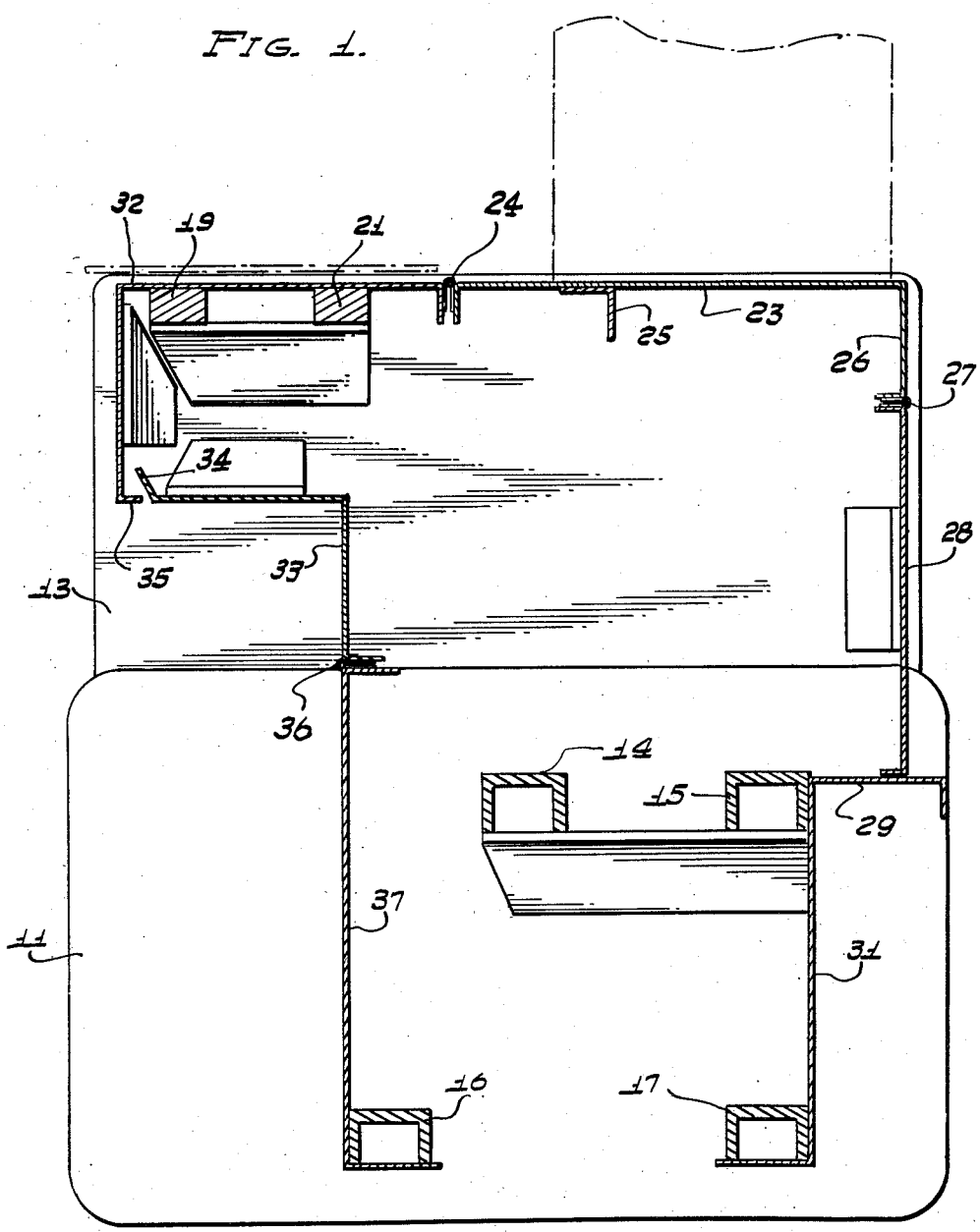

Dec. 31, 1957     F. R. BOKORNEY     2,817,972
VERTICAL SPINDLE BALANCING MACHINE
Filed June 22, 1956     3 Sheets-Sheet 1

INVENTOR.
FRED R. BOKORNEY
BY
ATTORNEY

Dec. 31, 1957   F. R. BOKORNEY   2,817,972
VERTICAL SPINDLE BALANCING MACHINE
Filed June 22, 1956   3 Sheets-Sheet 2

INVENTOR.
FRED R. BOKORNEY
BY
ATTORNEY

Dec. 31, 1957  F. R. BOKORNEY  2,817,972
VERTICAL SPINDLE BALANCING MACHINE
Filed June 22, 1956  3 Sheets-Sheet 3

INVENTOR.
FRED R. BOKORNEY
BY
ATTORNEY.

United States Patent Office 2,817,972
Patented Dec. 31, 1957

2,817,972
VERTICAL SPINDLE BALANCING MACHINE
Fred R. Bokorney, Westchester, Ill.

Application June 22, 1956, Serial No. 593,288

3 Claims. (Cl. 73—471)

The present invention relates generally to balancing machines and concerns itself more particularly with apparatus of this class wherein the principal work spindle is disposed in a vertical direction.

In the testing of certain classes of manufactured piece-parts for dynamic balance where the axial dimension is small or essentially inferior to its diametric one, it is expeditious to utilize vertical axis rotation for reasons of greater facility in applying and removal from the test machine, as well as for reasons of greater scope for observation and access while making on-the-test-machine corrections. Squat classes of pieceparts, particularly, when also of the more massive types, may be considered as though existing in a single plane, wherefor test operations may be of the static rather than dynamic nature and consequently correction, when required, may be effected without regard to axial relationship and solely on the basis of circumference.

The test machine operator may be seated before his vertical spindle apparatus, with the work stacked or loaded in tote boxes coming toward him at one side, and his drill spindle or other correction device situated at his other side. The magnitude of any eccentricities may be observed on the electrically responsive indicators on top of the test machine, and the angular location thereof by means of the usual stroboscopic flash lamp illuminating an angularly marked plate or disc which rotates with the work. It is therefore of utmost importance to high production rate in the performance of such test operations to achieve maximum accessibility to the work at a low level, as well as to be able to avoid fatigue of the operator on account of portage, body or long arm movements, or excessive concentration to avoid hazards.

Accordingly, a prime object of the invention is to provide a low level fully shrouded vertical spindle balance testing machine which will undergo long periods of test operation following the setting up adjustments necessary to accommodate particular workpiece requirements.

Another object of the invention is to provide such a machine which presents its work supporting spindle at low well forward position, unencumbered by hazardous or moving parts within range of the operator's sphere of activity during performance of testing operations or correction operations, while yet making available to him in a seated position in front of the spindle easy access to control over the test machine, its visual indicators, and most of all, total circumferential access to the borne workpiece.

Yet another object of the invention is to provide a balance testing machine of the class described, in which the work spindle itself is of minimum length, thereby making it increasingly responsive to unbalance vibrations of even low magnitudes, and in which the spindle journal and carriage are suspended from unidirectional flat steel springs in seismic mount fashion, and in which, notwithstanding full depth springs for greater flexibility, spindle shaft length is thereby not increased.

Figure 2:
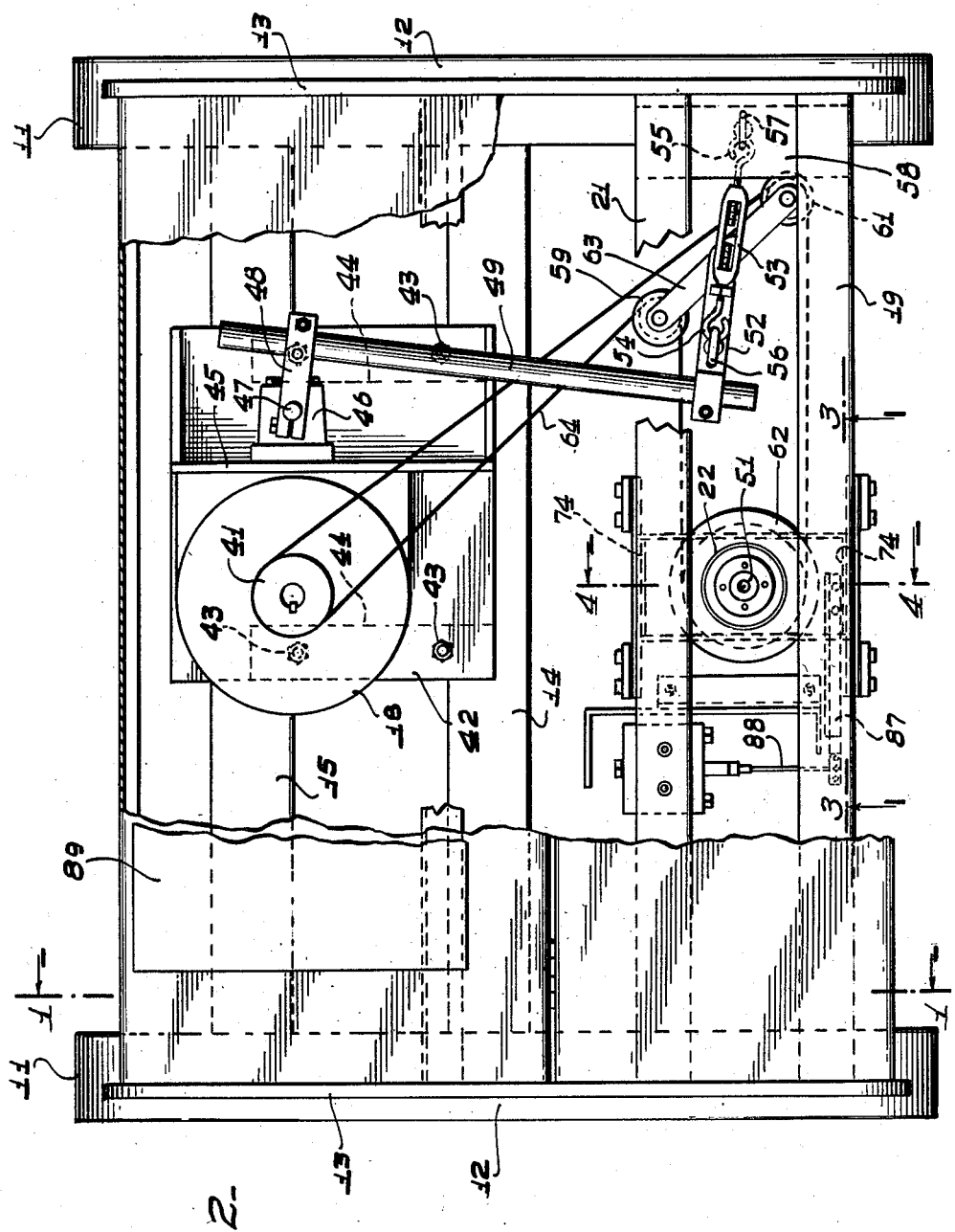
Figure 3:
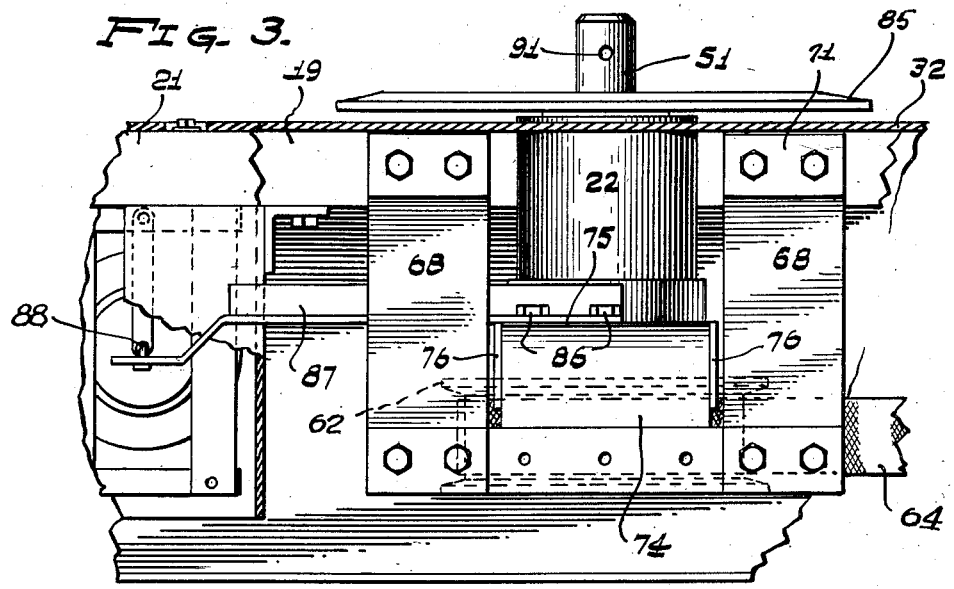
Figure 4:
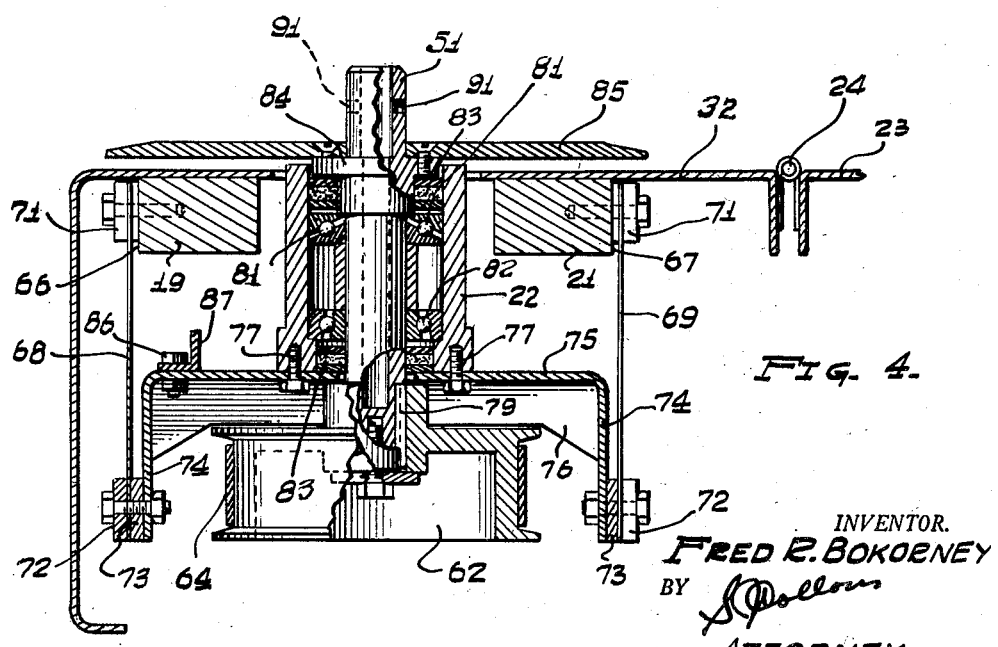

The foregoing and other objects and purposes of the present invention are such as will be revealed during the course of the following detailed description, having particular reference to the accompanying drawings, in which similar reference characters designate corresponding parts throughout, and in which:

Fig. 1 is a side sectional view taken approximately along line 1—1 of Fig. 2, showing the side frame structure with the transverse motor mount and spindle carriage support beam elements in section, Fig. 2 is a plan view of the same machine shown in Fig. 1 having various portions of the cabinet and cover shroud broken away to reveal nethermost operative structure, Fig. 3 is a fragmentary sectional view on an enlarged scale taken along line 3—3 of Fig. 2, and Fig. 4 is another fragmentary sectional view on an enlarged scale taken along line 4—4 of Fig. 2.

In the accompanying drawings, the reference numeral 11 points to a sheet fabricated side frame base member which may be made in accordance with the teachings of my copending application Ser. No. 350,011, filed April 21, 1953, now Patent No. 2,743,074. Two such members are required, one for each side frame, and welded onto the top channel component 12, Fig. 2, of each is a stanchion plate 13. The opposed base members 11 are integrated together by means of the four transverse inverted channel beams 14, 15, 16 and 17, of which the first mentioned two serve the purpose of supporting the electric motor drive unit 18. In corresponding manner, the stanchion plates 13 are tied together by means of transversely disposed bars 19 and 21, and these elements serve the additional purpose of mounting the spindle journal carriage 22, as will be more fully disclosed later, together with its vibration pick-up and attendant components.

From Fig. 1 it may be seen how the within contained mechanism of the balancing machine is fully shrouded by means of sheet metal cover panels of which a rigid one 23 extends from the forward hinge alignment 24 horizontally over the stiffening angle 25 and is bent downwardly to form a top apron 26 for the rear wall composition. At 27 there is hinged to the apron 26 a swingable rear wall cover panel 28, which may be opened when it is desired to gain access to the motor unit or other apparatus thereat disposed. The bottom edge of cover panel 28 is bent inwardly and, during closed position, lies over a ledge section 29 of a bottom rear rigid panel 31, recessed to line up with the outer surfaces of inverted channels 15 and 17.

Access to the front of the machine may be had by swinging upwardly and backwardly the forward corner panel 32 about its hinge line 24, and correspondingly, when this has been done, recessed panel 33, whose lip 34 is normally blocked by apron flange 35 of corner panel 32, may be swung downwardly about its hinge line 36 to a limited extent. Finally, fixed panel 37 which is disposed in a vertical plane forms a protective shield to prevent the operator from inadvertently coming into conflict with the apparatus located in the base region of the machine. The recession of panels 33 and 37 afford knee room whereby the test machine operator may sit well into the front end with his arms and head close to the work for visual and manipulative facility. This not only reduces the likelihood of error but diminishes fatigue and allows more work to be done in a given time period.

Motor unit 18, Fig. 2, is comprised of a vertical shaft electric mover carrying a drive pulley 41 and a platform 42, which is adjustably clamped by bolts 43 and clamp plates 44 to the inverted channels 14 and 15. Fast to a vertical wall 45 thereof is a mount fixture 46 which carries the vertical shaft 47 from which is swung a short support arm 48. The support arm 48 in turn carries a cylindrical bar member 49 which extends in the general direction of the spindle 51 and at its extremity is fastened a clamp arm 52.

The bar member 49 is free to pivot about shaft 47 as a center but because restrained by a turnbuckle 53 whose opposite eyebolt ends 54 and 55 link with similar elements 56 in the arm 52 and 57 in the angle bracket 58, there results the stabilization of arm 52 in a region which may be precisely located by adjustment of turnbuckle 53 and clamp arms 48 and 52 to dispose the pivot bearing extremity of arm 52 at the right position to align idler pulleys 59 and 61 with driven pulley 62 secured to shaft 51. From Fig. 2 it may be seen that idlers 59 and 61 are carried on the ends of a space bar 63 whose center is pivoted at the end of arm 52, and that in this way there is achieved a free floating take-up for the slack in belt 64 that threads around drive pulley 41, over the idlers and around driven pulley 62. When the belt becomes stretched, slack may be taken up incrementally by simply resetting the turnbuckle.

From Figs. 3 and 4 it will be clear that the transversely extending support bars 19 and 21, which are parallel and accurately level with each other, lie just beneath the forward shroud panel 32. From the extreme sides of the two bars, designated 66 and 67 in Fig. 4, there hang aligned pairs of flexible steel springs 68 and 69. The ends of the springs are made fast by means of bolt blocks 71 and 72, the former being bolted to the transverse bars 19 and 21 while the latter are bolted to companion blocks 73 as well as to downwardly extending flanges 74 of a bridge beam 75, reinforced by side bracing elements 76.

This bridge beam 75 constitutes the primary frame to which the carriage 22 is secured as at 77 by means of bolts. Because the flat steel springs 68 and 69 all lie in parallel planes they permit the bridge 75 to sway in side to side manner from center as shown in Fig. 4, but not to do so in the same sense as viewed in Fig. 3. This motion which may be induced by out-of-balance conditions in a piecepart carried by and rotated with shaft 51, will produce reciprocal motion up and down as viewed in Fig. 1. Since shaft 51 is rotated by pulley 62, keyed as at 79 thereto, such motion or vibration will have little if any effect upon the belt drive 64 because its direction is perpendicular to the belt sections which extend from idlers 59 and 61. Moreover, this section of belt comes toward the driven pulley in flights which are parallel to and under the bridge 75 and its flanges 74.

Thus, while the pendulous support springs 68 and 69 are relatively long, the shaft assembly now to be described, is appreciably shorter and therefore freer from effects of mass and torque. What has been designated as the carriage 22 consists essentially of a sleeve or casing within which are fitted at opposite ends the ball races 81 and 82, and within them, the grease retainers 83. The shaft 51 is provided with a flange portion 84 to which is secured a disc 85, bearing radial markings from which the operator may note during the strobe flashes the angular location of the out-of-balance condition that causes the vibration.

At 86 there is bolted to the bridge 75 an arm 87, the remote end of which is fastened to a thrust rod 88 which is connected to the generating coil of a pick-up unit, such as disclosed in my application Ser. No. 354,072. The vibrations are in this way transmitted to the pick-up which induces voltage manifestations upon dial instruments located on the facing surface of cabinet 89, to be observed by the operator. The piece parts are secured to suitable adaptors borne on the uppermost end of shaft and anchored by means of the threaded holes 91.

While the invention has been explained and described by referring to a specific embodiment, it is to be understood that no limitation is thereby intended, except as indicated in the hereunto appended claims.

What I consider to be new and for which I desire issuance of Letters Patent is:

1. In a balancing machine, a pair of side frames, a plurality of beam elements connecting said side frames, two of said elements being located at the foremost part of said machine and parallel with each other, a vertical workspindle, a journal carriage for supporting said workspindle, a bridge beam for supporting said carriage comprising an upper level floor panel and opposed downwardly extending end flanges, flat steel springs disposed in parallel planes having their upper ends bolted to said two forward beam elements and their lower ends bolted to said end flanges, a driven pulley carried by said workspindle at its lowermost extremity and between said end flanges, and a power transmission system comprising a vertical shaft prime mover disposed upon rearward ones of said beam elements and having a driving pulley at the level of said driven pulley, a pair of idler pulleys also disposed at said level and carried on a floating spacer bar at one side of said machine transversely parallel with said driven pulley, and an arm carrying said spacer bar pivotable through an arc substantially tangential with a median line between said forward two beam elements whereby slack take-up adjustment in a power transmission belt passing around said pulleys may be made by moving said arm through its said arc.

2. The combination set forth in claim 1 including a turnbuckle adjustment having one end connected to said arm and its other end connected to a stationary anchor in said machine.

3. In a vertical spindle balancing machine, a pair of transverse parallel rails, a rectangular bridge beam comprising a horizontal platform and downwardly extending end flanges affording a nethermost clearance beneath said platform and between said end flanges, a journal carriage mounted on said platform, a workspindle journaled in said carriage having its upper end extending above and between said parallel rails and its lower end extending between said end flanges, a driven pulley mounted on the lower end of said workspindle, and a power transmission system for rotating said workspindle which comprises a driving pulley located to the rear of said rails, a pair of idler pulleys movable through a course substantially parallel with said rails, and an endless belt trained around said driving and driven pulleys and passing around said idler pulleys with flights between said idler pulleys and said driven pulley passing parallelly between said rails.

References Cited in the file of this patent

UNITED STATES PATENTS

| | | |
|---|---|---|
| 2,327,609 | Saltz | Aug. 24, 1943 |
| 2,382,843 | Annis | Aug. 14, 1945 |
| 2,724,971 | Kroft et al. | Nov. 29, 1955 |